UNITED STATES PATENT OFFICE.

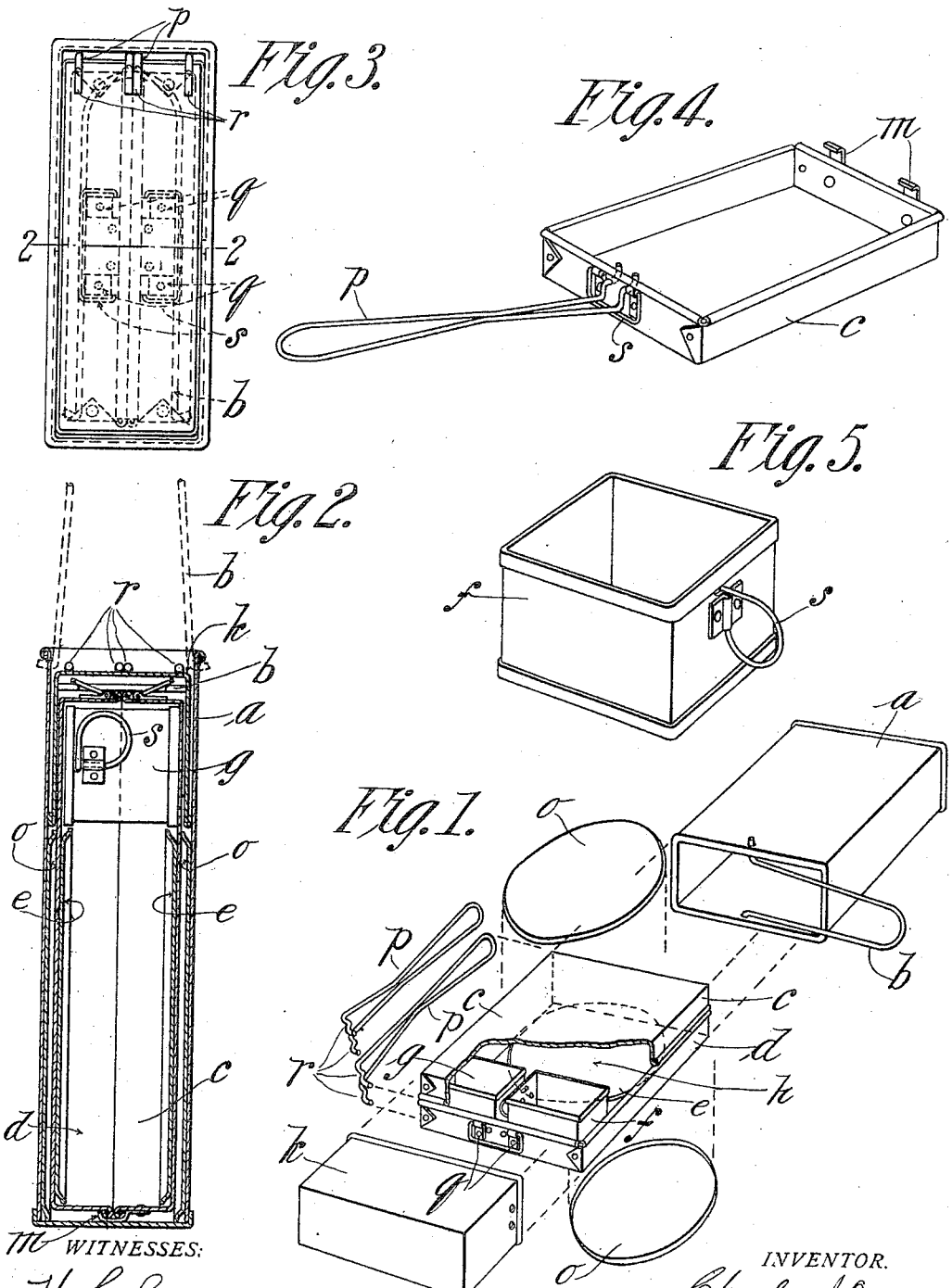

CHARLES A. DODGE, OF SPRINGFIELD, MASSACHUSETTS.

MESS-KIT.

971,179.  Specification of Letters Patent.  Patented Sept. 27, 1910.

Application filed June 21, 1909. Serial No. 503,376.

*To all whom it may concern:*

Be it known that I, CHARLES A. DODGE, a citizen of the United States of America, residing at Springfield, in the county of Hampden and State of Massachusetts, have invented new and useful Improvements in Mess-Kits, of which the following is a specification.

This invention relates to an improvement in mess-kits, the object of the invention being to provide in the kit forming the subject matter of this application, a construction whereby the essential articles for a camping outfit may be nested together in as compact a space as possible.

The preferred embodiment of the invention is clearly illustrated in the accompanying drawings, in which,—

Figure 1 is an isometric view of the component parts of the entire kit in separated relations, certain parts being broken away to more clearly illustrate the mode of assemblage of the parts. Fig. 2 is a vertical, sectional view of the assembled parts of the kit, the section being taken on lines 2—2, Fig. 3. Fig. 3 is a plan view of the assembled parts of the kit looking at the top thereof. Fig. 4 is a perspective view of one of the frying pans showing the manner of attaching the handle thereto. Fig. 5 is a perspective view on an enlarged scale of one of the cups forming part of the kit.

Referring now to these drawings, $a$ indicates a kettle made of metal which serves as the container for all of the other parts of the kit. This kettle has a spring handle $b$, the outwardly turned ends of which may be snapped into holes located near the upper edge of the kettle, whereby the latter may be suspended over a fire, the handle $b$ being removed to permit the insertion of the parts to be described which are nested in the kettle.

$c$ and $d$ are two frying pans which, when placed edge to edge, as shown in Figs. 1 and 3, serve as the container for two plates $e$ and for two rectangularly shaped cups $f$ and $g$. Preferably, these cups are placed in one end of the pans, as shown, the plates being located in the remaining space in which they fit snugly, to the end that they may serve to hold the cups $f$ and $g$ in their assigned position. This disposition of these articles within the inclosure formed by the two pans $c$ and $d$ provides a relatively capacious storage space $h$ between the pans for food; other articles of food being carried within the cups $f$ and $g$. When the pans $c$ and $d$ have been arranged, as shown in said Fig. 1, a rectangular cup $k$ is fitted over the upper end thereof, which serves to lock these pans together at one end, their separation at the other end being provided against by means of one or more hooked clips $m$ riveted to one of the pans,—as $c$ for example, Fig. 4,—the hooked end of the clips extending over the beaded edge of the other pan in the manner shown in Fig. 2. When the clips $m$ are in engagement with said edge, as described, and the rectangularly shaped cup $k$ fitted over the other end, the two pans may be handled without easily effecting a separation thereof. When the cup $k$ is fitted over the end of the two pans, as shown, and the assembled parts are fitted into the kettle $a$, a narrow space is provided between the inner wall of the container and the bottom of each pan $c$ and $d$, which is equal in depth, transversely, to the thickness of the sides of the cup $k$, and into this space two additional plates $o$ may be placed, the width and height of this space being limited by the internal dimensions of the kettle $a$ below the edge of the cup.

Each of the frying pans $c$ and $d$ is provided with a handle $p$ removably attachable to the pan (preferably in the manner shown in the drawing) by means of perforations $q$, see Figs. 1 and 3, in the end of the pan into which the hooked ends $r$ of the handle may be passed, as shown in Fig. 4.

When all of the assembled parts are nested in the container or kettle $a$, they are made to fit snugly therein on the two sides and one end thereof, sufficient space, as shown in Fig. 3, being left at the opposite end to permit the insertion of the two frying pan handles $p$ whose hooked ends fit over the edge of the cup $k$, as shown in Fig. 2. These handles $p$ are slightly bent, or curved from one end to the other so that when they are fitted into the container in the manner shown in Figs. 2 and 3, they will act as a species of bow-spring which will serve to retain the parts and retain themselves in the container.

The handle $b$ of the kettle or container $a$ may be sprung into the bottom of the cup $k$, as shown in Fig. 2, or it may be sprung in between the sides of the container above the cup, as shown in Fig. 3. The frying pans and the cups may be provided, and preferably are provided, with bails or handles $s$, in the manner shown in the drawing.

A mess-kit constructed as herein described provides in a very compact form all of the essential articles necessary to camp life for cooking purposes, and reduced to the smallest possible compass; and for the sake of lightness, all of the articles are preferably made of aluminum. If desired, the two plates $e$, instead of being put on the bottom of one of the pans, as shown in Fig. 1, may be arranged as shown in Fig. 2, one on the bottom of each pan with the food space between the plates. The small cup $k$ which is only of about one-third of the cubic contents of the container, is also provided with perforations whereby one of the handles $p$ may be inserted therein so that it may be used as a cooking utensil in addition to the container $a$ and the frying-pans $c$ and $d$.

What I claim, is:—

A mess-kit consisting of a kettle constituting the container for the other parts of the kit, two frying-pans arranged face to face constituting an inclosure for food, cups in said space, and plates arranged therein to hold the cups in position, another cup adapted to fit over the ends of the pans to hold them in assembled relation, said pans and retaining cup being contained in said kettle, together with handles for said kettle and frying-pan located between the wall of the container and the contents of the latter to serve as a retaining wedge to hold the contents in the container.

CHARLES A. DODGE.

Witnesses:
 ANNA K. TIFFANY,
 ELIZABETH A. BLAKE.